US007565232B2

(12) United States Patent
Baumgartner et al.

(10) Patent No.: US 7,565,232 B2
(45) Date of Patent: Jul. 21, 2009

(54) CONTROL ELECTRONICS INTEGRATED IN A BRAKE, PREFERABLY A DISC BRAKE

(75) Inventors: Johann Baumgartner, Moosburg (DE); Guenther Gschossmann, Ampfing (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 156 days.

(21) Appl. No.: 10/556,062

(22) PCT Filed: May 6, 2004

(86) PCT No.: PCT/EP2004/004812

§ 371 (c)(1),
(2), (4) Date: Feb. 21, 2007

(87) PCT Pub. No.: WO2004/098912

PCT Pub. Date: Nov. 18, 2004

(65) Prior Publication Data

US 2007/0276573 A1    Nov. 29, 2007

(30) Foreign Application Priority Data

May 8, 2003    (DE) ................. 103 20 607

(51) Int. Cl.
*G06F 19/00*    (2006.01)
(52) U.S. Cl. ................. 701/70; 701/36; 701/83
(58) Field of Classification Search ................. 701/36, 701/70, 71, 78, 83; 280/261; 318/109; 188/72.5, 188/71.8, 381
See application file for complete search history.

(56) References Cited

U.S. PATENT DOCUMENTS

| 3,015,950 | A |   | 1/1962 | Doctor et al. |
| 3,869,024 | A | * | 3/1975 | Hauth et al. ............... 188/72.5 |
| 4,050,548 | A | * | 9/1977 | Margetts .................... 188/71.8 |
| 5,452,262 | A | * | 9/1995 | Hagerty ........................ 367/6 |
| 6,250,434 | B1 | * | 6/2001 | Baumgartner et al. ...... 188/71.7 |
| 6,407,662 | B1 |   | 6/2002 | Gomez De Sebastian |
| 6,535,803 | B1 |   | 3/2003 | Fennel |
| 7,219,755 | B2 | * | 5/2007 | Goertzen et al. .......... 180/65.1 |
| 2001/0008083 | A1 |   | 7/2001 | Brown |

FOREIGN PATENT DOCUMENTS

| DE | 197 56 519 A1 | 10/1998 |
| DE | 199 00 082 A1 | 8/2000 |
| DE | 100 44 266 A1 | 4/2002 |
| DE | 101 48 472 A1 | 4/2003 |
| EP | 1 308 321 A1 | 5/2003 |
| WO | WO 02/14708 A2 | 2/2002 |
| WO | WO 02/47924 A1 | 6/2002 |

* cited by examiner

*Primary Examiner*—Gertrude Arthur Jeanglaud
(74) *Attorney, Agent, or Firm*—Crowell & Moring LLP

(57) ABSTRACT

Control electronics integrated in a brake, preferably a disc brake, are provided in particular for utility vehicles. The disc brake includes a brake caliper covering a brake disc and a brake application device with pneumatic or electromotive actuation, located in the brake caliper and used for applying the brake. The control electronics monitors specific parameters of the brake and regulates braking components and is connected to a power supply. The control electronics is characterized in that it includes at least one transmitter/receiver unit which is in active connection with a sensor external to the brake, pertaining to the wheel or proximate the wheel.

21 Claims, 1 Drawing Sheet

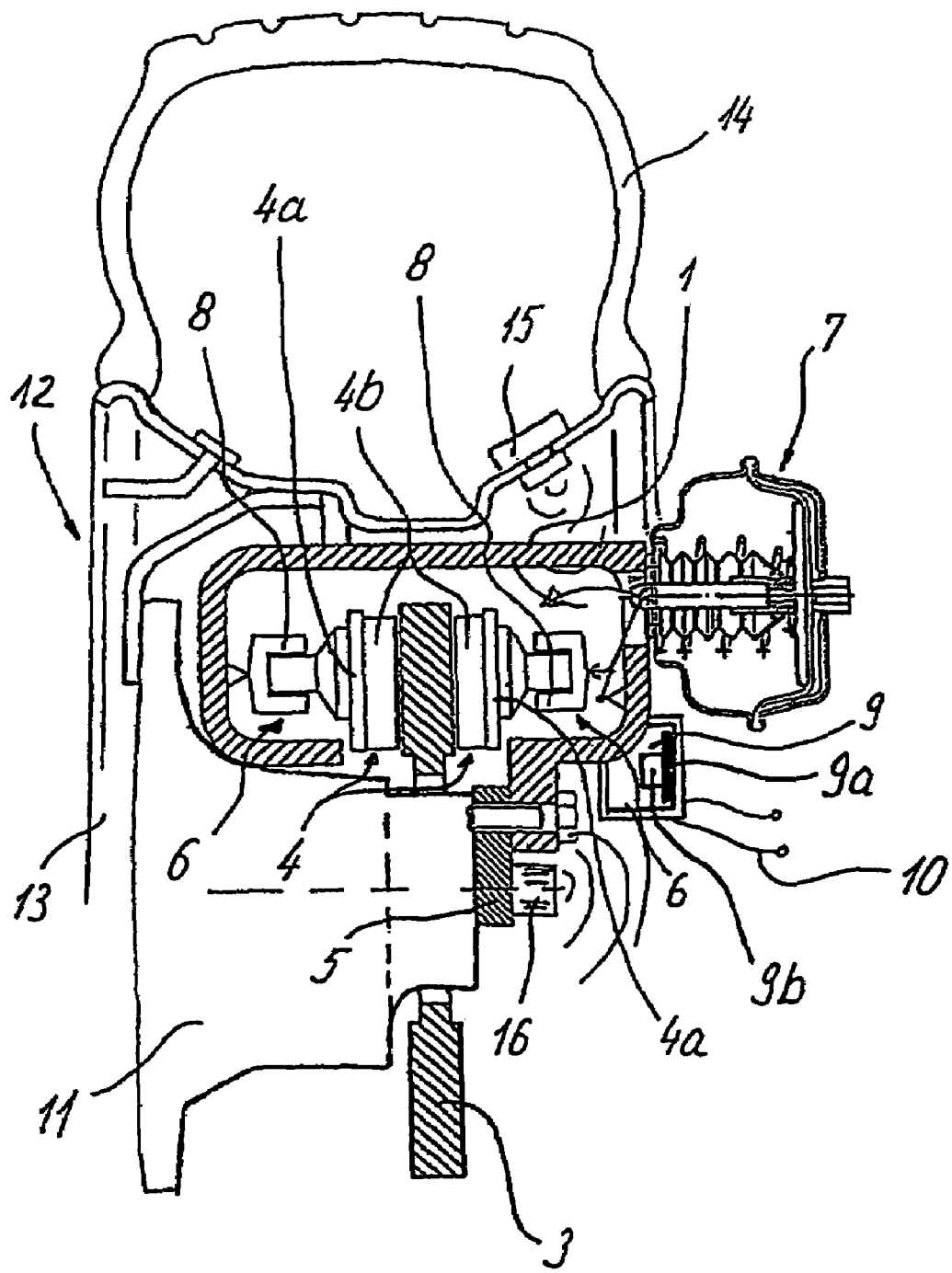

CONTROL ELECTRONICS INTEGRATED IN A BRAKE, PREFERABLY A DISC BRAKE

BACKGROUND AND SUMMARY OF THE INVENTION

The present invention relates to control electronics integrated in a brake, preferably a disc brake, in particular for commercial vehicles, with the disc brake having a brake caliper, which extends over a brake disc, and a pneumatic or electric motor-operated brake application device, which is arranged in the brake caliper and serves to apply the brake. The control electronics, which serve to monitor brake-specification parameters and control brake components, are connected to a power supply.

Control electronics integrated in a disc brake are known from DE 197 56 519 A1, for example. Control electronics of this type can be used to detect brake-specific parameters and to control and/or regulate brake components. This includes, for example, operation of an electromechanical wear adjustment system.

In order to be able to operate, the control electronics have an external power supply. The control electronics are able to interchange information with other vehicle systems via a corresponding connection, for example a CAN bus connection.

Control and monitoring systems are increasingly being used to detect and evaluate vehicle-specific or driving-specific data. In this case, sensors are predominantly also arranged on the vehicle wheels, examples of these sensors being tire pressure sensors, wheel force sensors, wheel rotational speed sensors or the like, and are used to determine specific parameters and transmit them to corresponding receiver and evaluation units, preferably in a contactless manner.

So-called "near-field telemetry systems", in which the sensor arranged on each vehicle wheel is passively operated, serve the purpose of contactless transmission. In this case, the sensor does not have its own power source, but is equipped only with a coil which is excited with electromagnetic pulses for transmitting the measurement signal by a transmitting and receiving device of the stationary evaluation and control device. In addition, acoustic or optical excitation of the coil is also known (DE 100 44 266 A1).

In order to start operation of the sensor, an interrogation signal, which charges a capacitor in the sensor, is emitted by the evaluation electronics. The sensor is operated by means of using the power stored in the capacitor.

If addressing by coding is necessary, a plurality of sensors are operated by the receiver/evaluation electronics. In this case, addressing can be performed by coding the signals in terms of interrogation and response, or by using different frequencies for the individual sensors.

In each case, the stationary evaluation and control device requires all the elements of an electronic apparatus, such as a power supply, a signal line or a CAN bus connection, a protective housing with cabling and/or a plug connection, and the like.

On account of the large number of sensors introduced in the meantime, a corresponding number of receiver/evaluation electronics systems, which are fixed in place on the vehicle, have to be provided, and this can naturally be achieved only with considerable physical complexity.

This requirement leads not only to corresponding production costs but consequently to a higher susceptibility to faults too, since a large number of receiver/evaluation electronics systems naturally form potential points of interference which stand in the way of optimum operation.

The present invention is therefore based on the object of further developing control electronics of this generic type in such a way that their ability to operate is increased.

This object is achieved by control electronics integrated in a brake, preferably a disc brake, in particular for commercial vehicles, with the disc brake having a brake caliper, which extends over a brake disc, and a pneumatic or electric motor-operated brake application device, which is arranged in the brake caliper and serves to apply the brake. The control electronics, which serve to monitor brake-specific parameters and control brake components, are connected to a power supply. At least one transceiver unit is provided in the control electronics and is operatively connected to at least one sensor, which does not belong to the brake and is part of or close to the wheel.

This physical design of the control electronics means that, in addition to the electronic components for monitoring and controlling the disc brake and/or brake-specific components, the electronic components, i.e. transceiver units, for the sensors can be combined to form one unit, these electronic components being present to monitor functional parts or functions which do not belong to the brake.

The integration of this additional transceiver unit means that the existing surrounding electronics can be used, as a result of which a considerable saving is made on subassemblies which would otherwise be necessary.

Installation is also simplified since now only the control electronics need be mounted, which results not only in a reduction in costs but also a reduction in susceptibility to faults which is correspondingly higher when there are a multiplicity of structural units than when there is only one.

The amount of space needed is equally minimized, and this is always desirable in vehicle construction and is achieved by the invention in an optimum manner.

The sensors may draw their operating power from an integrated power source, for example a battery.

In one particularly advantageous embodiment of the invention, the sensors are operated by way of the abovementioned telemetry system which is known per se and in which the power of the transmission signal from the transceiver unit integrated in the brake is used.

The measurement signals from the respective sensors can be separately received, amplified and forwarded to evaluating vehicle systems by sequential actuation of the respective sensors.

The use of only one control electronics system for all of the sensors mounted in the wheel region, and the resultant fact that separate control electronics systems are not needed, means that cabling for supplying power and forwarding signals is dispensed with, as are a housing with plug connections, seals and fixing devices, a power supply unit, overvoltage protection devices and other electronic components.

The transceiver unit of the telemetry system can be combined with the existing control electronics of the brake and, preferably, be mounted on the existing printed circuit board. In this case, the arrangement of the transceiver unit is selected in such a way that the sensor signals can be received without interference.

Further advantageous embodiments of the invention are described and claimed herein.

One exemplary embodiment of the invention is described below with reference to the attached drawing.

BRIEF DESCRIPTION OF THE DRAWING

The single FIGURE shows a schematic section illustration of a disc brake attached to a vehicle wheel.

DETAILED DESCRIPTION OF THE DRAWING

The FIGURE illustrates a disc brake as shown and described in WO 02/14708 A2 in principle. The disc brake has a brake caliper 1, which surrounds an upper circumferential region of a brake disc 3.

Both sides of the brake disc 3 have associated brake linings 4, which can move, and each have a lining material 4b applied to a brake lining support 4a.

The brake caliper 1 is fixed to a stationary axle flange 5 and cannot be moved from here. The brake caliper is therefore a so-called fixed caliper.

In order to operate the brake linings 4 for the purpose of applying and releasing the brake, a brake application device 6 is provided on one side of the brake caliper and can be operated by way of a pneumatically operated brake cylinder 7. This brake application device 6 presses the brake lining 4, which is on the right-hand side in this case, against the brake disc 3 and then the brake disc 3, which is movably guided on the axle, presses against the opposite brake lining 4 on the reaction side.

Each brake lining 4 has an associated adjustment device 8, which can be driven by an electric motor and adjusts the brake linings 4 as a function of wear.

The adjustment devices 8 are operatively connected to control electronics 9 which are an integral constituent part of the disc brake, are arranged on the outside of the brake caliper 1 in this case, and are firmly connected to the brake caliper 1 in the present exemplary embodiment. The control electronics 9 have a power supply 10 and a data connection (not illustrated), for example a CAN bus connection, for interchanging information with other vehicle systems. Data can also be transmitted in a wire-free fashion by the use of transmitters and receivers (not illustrated here).

As can be seen purely schematically in the figure, the disc brake and, thus, the control electronics 9 are arranged on the inside of a wheel 12, which has a hub 11, a rim 13 and a tire 14.

According to the invention, at least one transceiver unit 9b is provided in the control electronics and is operatively connected to at least one sensor, which sensor is independent of the brake and is part of, or close to, the wheel.

Sensors of this type are illustrated by way of example in the figure as tire pressure sensor 15 and rotational speed sensor 16, which can be provided with their own power supply, for example a battery, or can be operated by way of a telemetry system, as already mentioned.

In addition to these sensors, sensors of this type which are part of or close to the wheel can also be used and can determine, for example, the wheel bearing temperature, acceleration, vehicle inclination, distance or brake disc temperature, it being possible to use an ultrasonic or radar distance sensor to determine distances.

In each case, the associated transceiver unit 9b is in the control electronics 9, it being possible to provide a common transceiver unit 9b, which is preferably installed on a common printed circuit board 9a, for all of the sensors. In this case, the signals emitted by the sensors are correspondingly addressed or coded.

TABLE OF REFERENCE SYMBOLS

1 Brake caliper
3 Brake disc
4 Brake lining
4a Brake lining support
4b Lining material
5 Axle flange
6 Brake application device
7 Brake cylinder
8 Adjustment device
9 Control unit
9a Printed circuit board
9b Transceiver unit
10 Power supply
11 Hub
12 Wheel
13 Rim
14 Tire
15 Air pressure sensor
16 Rotational speed sensor

The invention claimed is:

1. Control electronics integrated in a disc brake for commercial vehicles, with the disc brake having a brake caliper, which extends over a brake disc, and a pneumatic or electric motor-operated brake application device, which is arranged in the brake caliper and serves to apply the brake, the control electronics, which serve to monitor brake-specific parameters and control brake components are connected to a power supply, wherein at least one transceiver unit is provided in the control electronics and is operatively connected to at least one sensor which does not belong to the brake and is part of or close to a wheel associated with the disc brake.

2. The control electronics as claimed in claim 1, wherein the at least one sensor is provided with its own power supply.

3. The control electronics as claimed in claim 1, wherein the transceiver unit and the sensor are operable by a telemetry system.

4. The control electronics as claimed in claim 1, further comprising a plurality of sensors, each sensor having an associated transceiver unit in the control electronics.

5. The control electronics as claimed in claim 1 further comprising a plurality of sensors, wherein all of the sensors which are part of or close to the wheel are operatively connected to a single transceiver unit.

6. The control electronics as claimed in claim 1, wherein signals emitted by the individual sensors are addressed or coded so that they are distinguishable by the transceiver unit.

7. The control electronics as claimed in claim 1, wherein the at least one transceiver unit is mounted on a printed circuit board of the existing control electronics of the brake.

8. The control electronics as claimed in claim 1, wherein the at least one transceiver unit is positioned in such a way that sensor signals are receivable without interference.

9. The control electronics as claimed in claim 2, further comprising a plurality of sensors, wherein, all of the sensors which are part of or close to the wheel are operatively connected to a single transceiver unit.

10. The control electronics as claimed in claim 3, further comprising a plurality of sensors, wherein, all of the sensors which are part of or close to the wheel are operatively connected to a single transceiver unit.

11. The control electronics as claimed in claim 4, wherein signals emitted by individual sensors are addressed or coded so that they are distinguishable by the transceiver unit.

12. The control electronics as claimed in claim 5, wherein signals emitted by individual sensors are addressed or coded so that they are distinguishable by the transceiver unit.

13. The control electronics as claimed in claim 5, wherein the at least one transceiver unit is mounted on a printed circuit board of existing control electronics of the brake.

14. The control electronics as claimed in claim 5, wherein the at least one transceiver unit is positioned in such a way that sensor signals are receivable without interference.

15. The control electronics as claimed in claim 7, wherein the at least one transceiver unit is positioned in such a way that the sensor signals are receivable without interference.

16. The control electronics as claimed in claim 2, wherein said own power supply is a battery.

17. A vehicle brake comprising:
    control electronics integrated into the brake, the control electronics being operatively configured to monitor brake-specific parameters and to control braking components;
    a power supply coupled to the control electronics;
    a transceiver unit arranged in and forming a part of the control electronics integrated in the brake; and
    wherein the transceiver unit is operatively configured for actively communicating with at least one sensor external to the brake and pertaining to a wheel or being configured in approximate vicinity of the wheel.

18. The brake according to claim 17, wherein the at least one sensor has a battery power supply.

19. The brake according to claim 17, wherein the transceiver unit and the sensor communicate via a telemetry system.

20. The brake according to claim 17, further comprising a plurality of sensors, wherein those sensors which are part of or in proximity to the wheel are operatively coupled to a single transceiver unit in the control electronics.

21. A wheel end of a vehicle, comprising:
    a wheel;
    a disc brake operatively arranged to brake the wheel, the disc brake comprising a caliper that straddles a brake disc, and includes a pneumatic or electric motor-operated brake application device arranged in the caliper to apply the brake;
    control electronics integrated in the disc brake, the control electronics being operatively configured to monitor brake-specific parameters and to control components of the disc brake;
    a power supply coupled to the control electronics;
    a transceiver unit arranged in and forming a part of the control electronics; and
    one or more sensors that are not a part of the disc brake, the one or more sensors being part of or in approximate vicinity of the wheel, the transceiver unit of the control electronics integrated in the disc brake being operatively configured for communicating with the one or more sensors.

* * * * *